J. F. O'CONNOR.
SHOCK ABSORBING MECHANISM.
APPLICATION FILED AUG. 30, 1916.
1,290,307.
Patented Jan. 7, 1919.
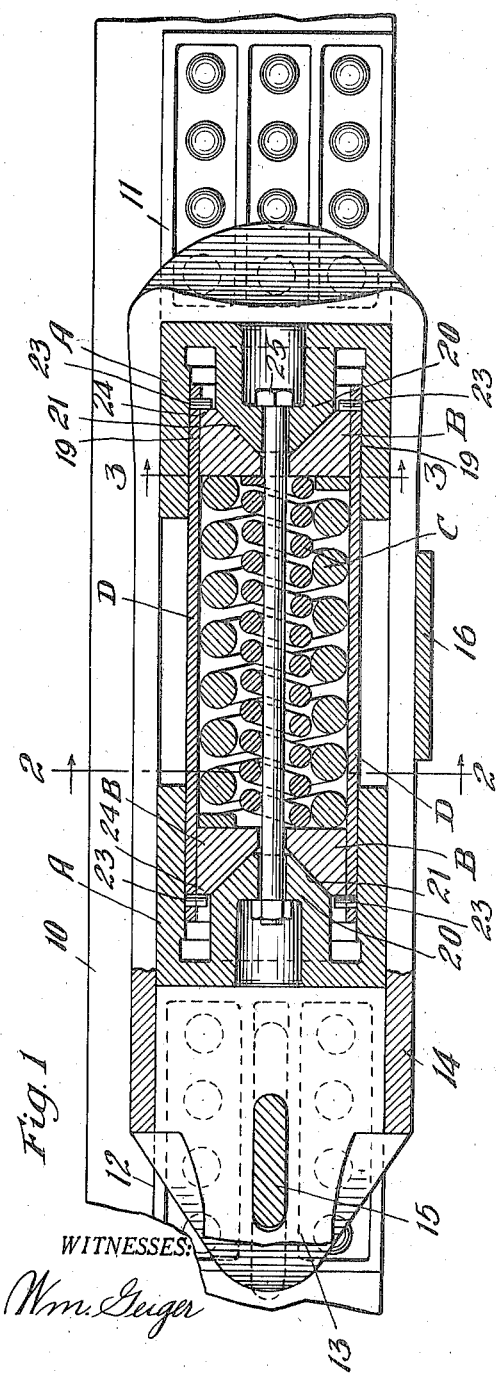
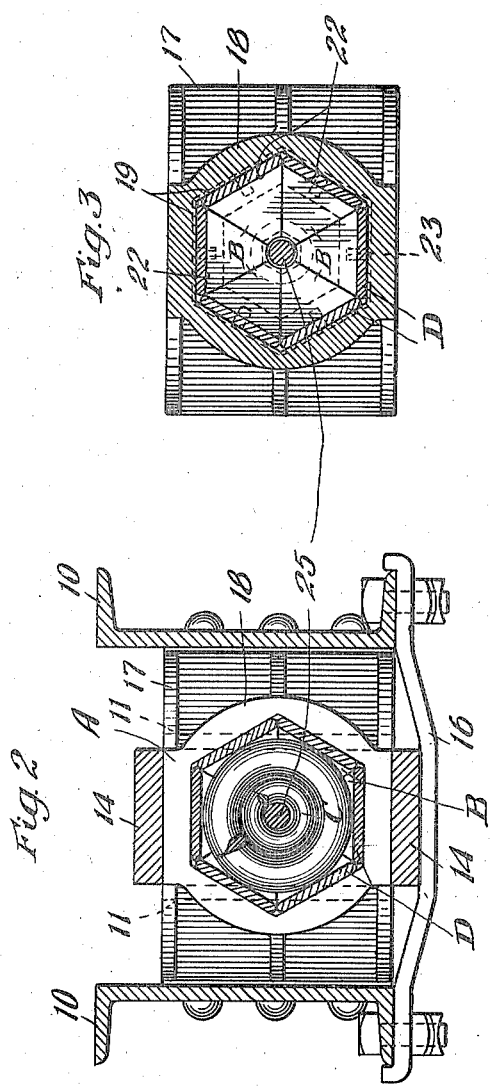
WITNESSES:
Wm. Geiger
INVENTOR.
John F. O'Connor
BY George J. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

SHOCK-ABSORBING MECHANISM.

1,290,307.  Specification of Letters Patent.  Patented Jan. 7, 1919.

Application filed August 30, 1916. Serial No. 117,591.

*To all whom it may concern:*

Be it known that I, JOHN F. O'CONNOR, a citizen of the United States, residing at Chicago, in the county of Cook and State of Illinois, have invented a certain new and useful Improvement in Shock-Absorbing Mechanisms, of which the following is a full, clear, concise, and exact description, reference being had to the acompanying drawings, forming a part of this specification.

This invention relates to improvements in shock absorbing mechanisms.

The object of the invention is to provide an improved spring shock absorbing mechanism having efficient means for overcoming recoil.

In the drawing forming a part of this specification, I have illustrated my improvements as adapted for a railway draft rigging, although it will be obvious to those skilled in the art that the shock absorbing mechanism may be employed in many other uses where heavy shocks are encountered.

In the drawing, Figure 1 is a vertical, longitudinal section of a car draft rigging showing my improvements in connection therewith and Figs. 2 and 3 are transverse, vertical sectional views taken on the lines 2—2 and 3—3, respectively, of Fig. 1, in Fig. 3 the draft sills and yoke being omitted.

In said drawing, 10—10 denote channel shaped center or draft sills of a car, to the inner faces of which are secured ordinary rear stops 11 and front stops 12. The drawbar 13 is operatively connected with the shock absorbing mechanism by means of a cast yoke 14 having a hooded forward end to which the draw-bar is connected as by a coupler key 15. The yoke and other parts of the draft rigging are supported by a saddle plate 16 which is detachably bolted to the lower flanges of the sills.

The improved shock absorbing mechanism, as shown, comprises a pair of oppositely arranged preferably malleable heads A—A, a plurality of friction blocks B—B associated with each of said heads, a spring C, and a plurality of steel spring staves D. Each of the heads A is provided with a rectangular outer end as indicated at 17 to thereby coöperate with the stops of the draft gear and act as follower. Inwardly of the rectangular section, each head is of substantially cylindrical form as indicated at 18 and is interiorly recessed, the recess, as shown in the drawing, being preferably hexagonal to thereby provide six friction surfaces 19—19. Centrally within the recess, each head A is provided with an inwardly extended wedge shaped projection 20, the latter having a series of wedge faces 21 arranged opposite to and corresponding in number to said surfaces 19. Mounted on each of the wedge sections 20 and within each head A, are the friction blocks B, there being also six of these to correspond to the number of wedge surfaces 21 and faces 19. As clearly appears from the drawing, the spring C bears at its ends against the two sets of blocks B so that the latter are always pressed firmly against the wedge sections 20. The staves D are also six in number, to correspond to the number of blocks B, each of said staves D having its ends slidably mounted between a face 19 and an outer face 22 of the corresponding block B. Each of the staves D is also provided with a pair of dowels 23, one at each end, the dowels 23 engaging the outer edges 24 of the corresponding blocks B to thereby limit the separation of the parts in the release. A retaining bolt 25 extends through the heads A—A and through the spring C, the latter preferably consisting of an inner and an outer coil.

In operation, upon either buff or draft, or upon relative approach of the heads A, it is apparent that the compression of the spring will serve to augment the pressure of the blocks B on the wedge sections 20. On account of the arrangement of the wedge surfaces, the blocks B will be forced outwardly or radially, thus increasing the friction between said blocks and the corresponding staves and between the latter and the corresponding surfaces 19 of the heads A—A. It is obvious that the staves D can continue their movement until the ends thereof engage the heads A, and on account of the staves D being of spring steel, the latter may buckle outwardly even after the ends thereof come into engagement with the heads A—A. Upon removal of the pressure from the spring and associated parts, the spring will expand and force the heads A—A apart. Due to the friction between the staves D and the surfaces 19 and blocks B, the expansion of the spring is automatically retarded and the recoil dampened, as will be obvious.

As clearly appears from Fig. 2, the staves D form, in effect, a casing for the spring thus tending to protect the latter and also assisting in maintaining the spring in proper position.

I have herein shown and described one specific embodiment of my invention, but the same is merely illustrative and I contemplate all changes and modifications that come within the scope of the claims appended hereto.

I claim:—

1. In a shock absorbing mechanism, the combination with two heads, of a spring between said heads, a casing surrounding said spring and extending from the interior of one head to the interior of the other head and slidable with respect thereto, and wedging elements at each end of said spring located within said casing and heads, said casing comprising a plurality of independent resilient staves adapted to buckle upon ultimate approach of said heads.

2. In a shock absorbing mechanism, the combination with a head and an abutment, of a spring, a casing surrounding said spring and extending from the interior of said head to said abutment, said head having an interior wedge, wedge elements coöperable with the wedge portion of said head, said casing comprising a plurality of independent and laterally yieldable resilient staves, said staves having their ends slidably mounted between portions of said head and said wedge elements, said staves being adapted to buckle upon ultimate approach of the head and abutment.

3. In a shock absorbing mechanism, the combination with a pair of oppositely disposed heads, each of said heads being recessed and having a wedge within said recess, of a spring extending between said heads, a plurality of wedge blocks at each end of said spring and coöperating with said wedges, and a plurality of plates extending along the outer surface of said spring, said plates having their ends slidably mounted between the inner surface of the head and corresponding wedge blocks, said plates and blocks having coöperating means to limit the amount of separation of the blocks.

4. In a shock absorbing mechanism, a pair of heads each recessed on its inner face and provided with a wedge on its interior, of friction blocks within each head and having wedge faces coöperable with said wedge, of a plurality of spring staves extending between said heads, said staves having their ends slidably mounted between the friction blocks and adjacent surfaces of the corresponding heads, a spring mounted within said staves, and a retaining member extending from one head to the opposite head to limit the amount of separation thereof.

In witness that I claim the foregoing I have hereunto subscribed my name this 26th day of August, 1916.

JOHN F. O'CONNOR.